(12) United States Patent
Green

(10) Patent No.: US 7,295,757 B2
(45) Date of Patent: *Nov. 13, 2007

(54) ADVANCING PLAYBACK OF VIDEO DATA BASED ON PARAMETER VALUES OF VIDEO DATA

(75) Inventor: Dustin Green, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 28 days.

This patent is subject to a terminal disclaimer.

(21) Appl. No.: 11/327,629

(22) Filed: Jan. 6, 2006

(65) Prior Publication Data

US 2006/0115237 A1    Jun. 1, 2006

Related U.S. Application Data

(62) Division of application No. 09/780,283, filed on Feb. 9, 2001, now Pat. No. 7,035,526.

(51) Int. Cl.
*H04N 5/91* (2006.01)

(52) U.S. Cl. .......................................... 386/68; 386/95

(58) Field of Classification Search ................. 386/46, 386/68, 69, 70, 95, 98, 111, 125
See application file for complete search history.

(56) References Cited

U.S. PATENT DOCUMENTS

| 5,535,008 A | * | 7/1996 | Yamagishi et al. | .......... 386/109 |
| 5,991,502 A | * | 11/1999 | Kawakami et al. | .......... 386/109 |
| 6,754,274 B2 | * | 6/2004 | Park | ....................... 375/240.25 |

* cited by examiner

*Primary Examiner*—Huy Nguyen
(74) *Attorney, Agent, or Firm*—Workman Nydegger

(57) ABSTRACT

A digital video data system automatically skips the playback of recorded video data to a position that corresponds to a transition between segments of the video data. Positions that are candidates for being segment transitions are identified by quantifying the rate of change of one or more parameters of the video data at multiple positions and determining positions for which the rate of change is locally maximal. Parameters such as luminance, I-frame frequency, and frame size tend to change most rapidly at segment transitions. Information relating to the change in the parameter values is stored with recorded video data so that it can be used to identify segment transitions during playback of the video data. During playback, and in response to user input, the system selects a position where the rate of change of parameter values is locally maximal and skips playback to that position.

24 Claims, 7 Drawing Sheets

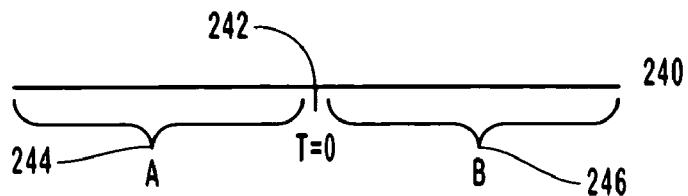
FIG. 6
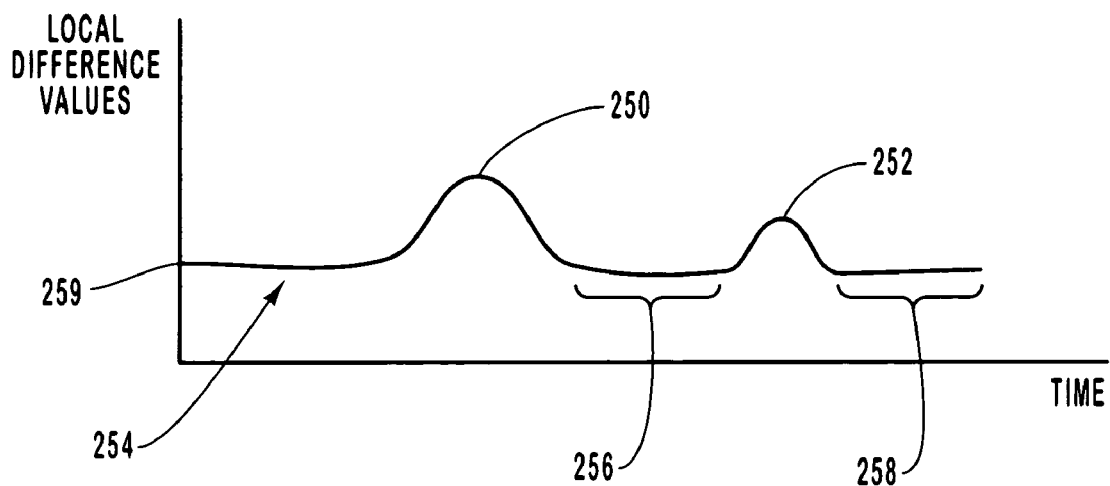
FIG. 7
CALCULATION OF AVERAGE DIFFERENCE — 260
$$\frac{(DV_A + \ldots Dv_n)}{n} = A_{DV}$$
DIFFERENCE VALUE FOR PARAMETER A =3
DIFFERENCE VALUE FOR PARAMETER B =1
DIFFERENCE VALUE FOR PARAMETER C =3
$$\frac{3+1+3}{3} = 2.33$$
FIG. 8

ADVANCING PLAYBACK OF VIDEO DATA BASED ON PARAMETER VALUES OF VIDEO DATA

CROSS-REFERENCE TO RELATED APPLICATIONS

This application is a divisional of application Ser. No. 09/780,283, filed Feb. 9, 2001 now U.S. Pat. No. 7,035,526, and entitled "ADVANCING PLAYBACK OF VIDEO DATA BASED ON PARAMERTER VALUES OF VIDEO DATA" which is incorporated herein by reference.

BACKGROUND OF THE INVENTION

1. The Field of the Invention

The present invention relates to skipping segments of a digital video selection. In particular, the present invention relates to a system for identifying segment transitions in video data, selecting a segment transition to which the playback of a recorded copy of the video data is to be skipped, and skipping playback to the selected segment transition.

2. Related Technology

Traditionally, during television programs, viewers have been limited in the ability to control the content of a program being viewed. For example, during a television commercial segment or any other segment that may not be of immediate interest, viewers have been either forced to view the entire segment or change the channel and wait for the segment to conclude. The advent of video cassette recorders (VCRs) allowed viewers greater control over the content of segments when the program was pre-recorded. In recent years some VCR systems have included a relatively unsophisticated one-touch commercial skip feature. The feature consists of little more than a mechanism for automatically fast-forwarding the playback of video data by thirty seconds. By pushing a single button, the VCR automatically advances the video tape by the estimated length of an average commercial segment. While this feature introduces the convenience of a one-touch skip, the length of the skip does not always correspond with the length of a segment that is not of immediate interest to the viewer and is particularly ill-suited for identifying many program transitions that do not have predictable durations.

The advent of digital video formats has allowed for many conveniences not considered practical for a traditional VCR system. Such digital video formats, in particular the Moving Pictures Experts Group (MPEG) and other video compression formats, allow for more sophisticated segment skips. For example, a viewer using a digital video data system that records digital video data on a hard disk or another mass storage device may skip or replay to predetermined scenes, without the time consuming fast forward or rewind of a video tape.

Although digital video systems can more conveniently jump from one portion of a video program to another without having to physically advance a tape, conventional digital video data systems have also generally been capable of advancing between video segments at predetermined increments, such as at thirty-second intervals. Thus, viewers of recorded video data, whether using VCR systems or digital video data systems, have generally been constrained to advancing the video playback in certain, restrictive ways. For instance, the viewer can cause the playback to be skipped ahead by thirty seconds. Alternatively, viewers who wish to advance the playback of a video program from one segment (e.g., a first news story) to a second segment (e.g., a second news story) have been forced to place the VCR or digital video data system in a fast-forward mode and then visually identify, by trial and error, the position that represents a segment transition.

SUMMARY OF THE INVENTION

The present invention is directed to systems and methods for skipping segments of a digital video selection. Digital video formats are associated with video data compression techniques that compress video images into manageable volumes of data for processing the images on a microprocessor or home entertainment system. In a video compression format such as MPEG, the data encoding each frame contains quantifiable parameters defining various properties of the frame. In a typical video selection, such as a television program, the quantifiable parameters defining the frames of different segments vary with time. For example, the parameters of a commercial segment are typically different from those of a television program segment. During a football game, the parameters of a scrimmage segment are often different from those of the commentary segment. By analyzing the parameters it is possible to identify transitions from one segment to a different and distinguishable segment.

The present invention identifies segment transitions and allows for skipping replay to a selected segment transition. The positions in the video data that are likely candidates for being segment transitions are identified based on the observation that parameters of the video data frequently change at the segment transitions. In order to identify such candidates for segment transitions, the video data system calculates "local difference values" for multiple positions in the video stream. A local difference value approximates the rate of change of a parameter value within a local temporal region surrounding the position in the video stream.

According to one implementation of the invention, the local difference values are calculated as follows. First, parameter values are determined for multiple positions in a recorded video stream, such as at every frame, at one-second intervals, or the like. Average values of the parameters for local areas preceding and following each of the multiple positions are calculated. The local difference values, which represent the absolute value of the difference between the average values of the preceding local area and the following local area, are then determined for each of the multiple positions. Segment transitions are identified by plotting the local difference values with respect to time, with local maxima of the plot of difference values representing likely candidates for segment transitions.

During playback of the recorded video stream, a viewer can issue a request to skip to the next segment transition. In response to the skip request, the system then automatically skips playback to a selected segment transition that has been identified by the local difference values. In this manner, the viewer can cause the video data system to automatically skip to a position in the recorded video data stream that likely represents a segment transition with greater flexibility than was possible using conventional methods. In particular, the playback of the video data can be skipped to a next segment transition that may be temporally displaced from the current playback position by an arbitrary amount of time, rather than by a predetermined amount of time, such as thirty seconds. Moreover, the viewer can rapidly and conveniently skip through a current segment of the recorded video data without being required to place the video data system in a fast-forward mode, view the remaining portion of the video data in the fast-forward mode, and then resume the normal speed playback mode when the current segment is completed, as has been required in many conventional systems.

The foregoing basic segment skipping technique can be augmented with other computational techniques that can improve the ability to recognize segment transitions that may be of interest to a viewer. For instance, if it is determined that segment transitions often occur at certain time intervals, such as at thirty-second or one-minute intervals, the local difference values that identify likely candidates for segment transitions can be weighted to favor likely candidates that are close to the time interval at which a segment transition can be expected. If, for example, segment transitions often occur at one-minute intervals, a distribution curve, such as a Gaussian distribution function, having a maximum value at one minute from the current playback position can be used as the weighting function. The local difference plot is reduced from a continuous plot to a plot of just the local maxima magnitudes against time, and these local maxima magnitudes are multiplied by the corresponding value of the Gaussian distribution curve to obtain weighted local difference maxima magnitudes. The maximum value obtained after weighting the local difference maxima in this way represents the appropriate segment transition to which to skip in this implementation.

Another variation on the basic method of using local difference values entails defining a standard range of local difference values to identify a desired transition. For example, it has been observed that certain standard types of segments (e.g., fast action, talking heads in news broadcasts, active play in a football game, etc.) have characteristic parameter ranges. Segment transitions between specified standard types of segments (e.g., slow action to fast action) can be identified by first identifying a local maximum in the local difference function and then determining whether the video data that precedes and follows the local maximum exhibits parameter values that are consistent with the characteristic parameter ranges associated with the specified standard types of segments.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 is a schematic diagram illustrating the calculation of difference values from local area average values.

FIG. 7 is a schematic diagram illustrating a distribution of difference values for a given parameter.

FIG. 8 illustrates the calculation of average difference for a plurality of parameters at a given position.

DETAILED DESCRIPTION OF THE INVENTION

Figure 1:
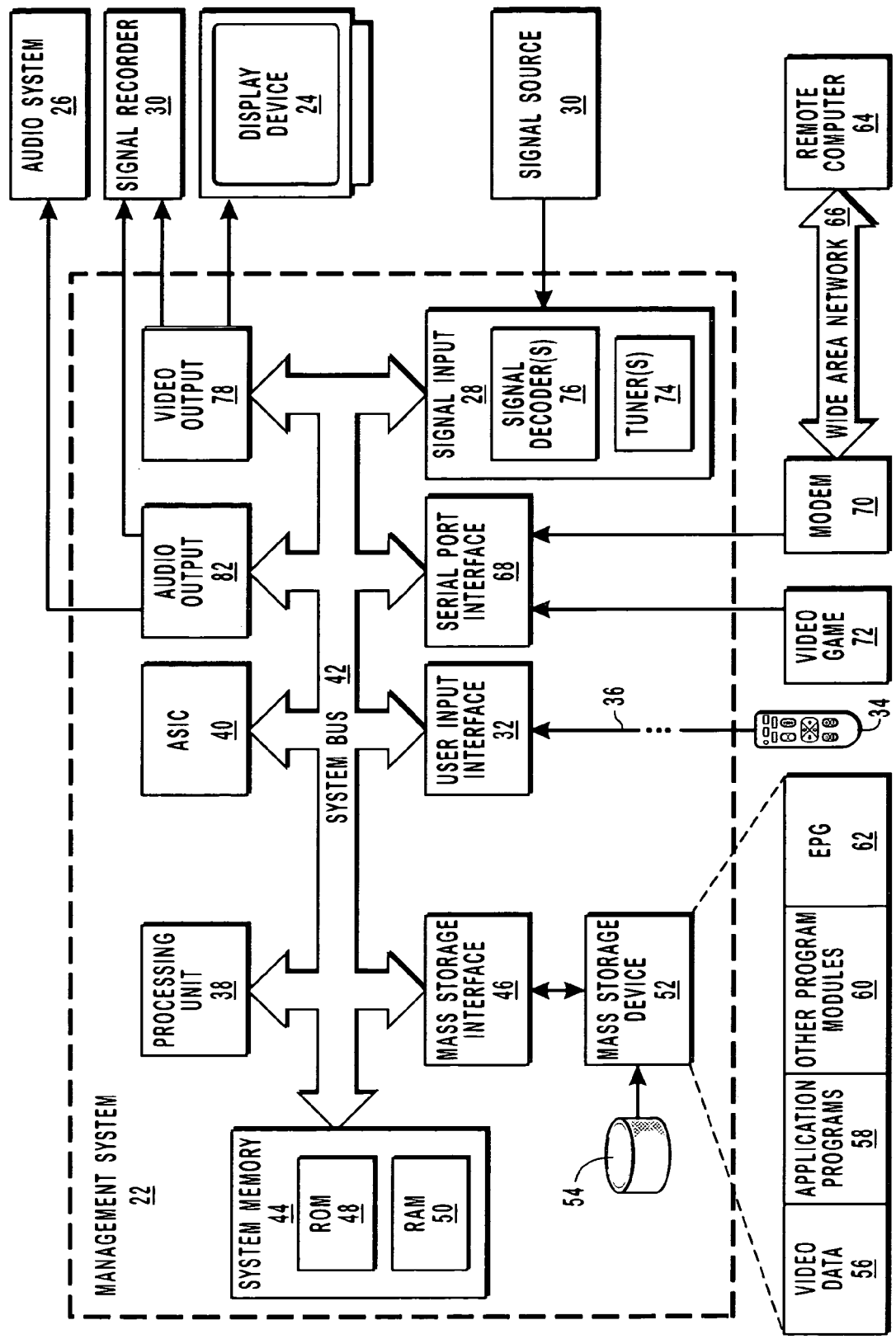
FIG. 1 illustrates an exemplary system that provides a suitable operating environment for the present invention.

The present invention extends to methods and systems for skipping segments of a recorded digital video selection. The current invention is practiced in the context of digital video formats. Digital video formats use computationally complex encoders to compress video images into manageable file sizes to be processed in the less complex video decoders contained in microprocessors or home entertainment systems. In video formats such as MPEG, the data encoding individual frames contain quantifiable parameters defining various properties of the frames. In a typical video program, parameter values change from one segment to another. By identifying changes in parameter values, for a plurality of parameters at a plurality of positions in the video stream, it is possible to identify where segment transitions occur. The playback of a recorded video program can be skipped to a segment transition based on changes in the parameter values.

Due to the complexity of segment transition identification operations, in one embodiment of the invention, the computational power of a compression encoder is used to calculate the values of parameters at multiple positions in the video data. This does not constitute a change in the encoder or in the data format of the video, since said parameters are already part of the data format. In this embodiment, once the segment transitions have been identified they are tagged by the client system and stored for later lookup by the client system. These tags contain information for distinguishing transitions, such as local difference values. Using these tags, the decoder can identify a segment break to which to skip by applying a Gaussian distribution function as a function of desirable skip length. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable operating environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

1. Exemplary Operating Environment

Referring now to FIG. 1, a schematic representation of one embodiment of a video data system that can be used to implement the invention is depicted. The video data system may include a management system 22, a display device 24, and an audio system 26. Generally, the video data system of FIG. 1 broadly represents a television-viewing environment, whether such environment is located in a viewer's home, at a place of business, in the public, or at any other location.

Although the video data system of FIG. 1 is depicted as including various separate components, it may be understood that such components may be combined into a single system or device. For instance, management system 22 can be integrally combined with or separate from display device 24, which is capable of displaying video programming or viewable video image data, broadcast programming, banner advertisements, video advertisements, and the like. Similarly, management system 22 may be integral with or separate from audio system 26, which may be a speaker, a stereo system, or any device capable of emitting sound data.

In one illustrative configuration, management system 22 of local module 18 is a set-top box or Internet terminal that can perform typical functions associated with a set-top box, while also performing those novel operations disclosed herein. Further, management system 22 represents any type of consumer electronic device capable of performing the functions described herein. For instance, management system 22 can be a television or monitor with data processing capabilities, a cable television box, a digital satellite system receiver ("DSS"), a digital video broadcasting system ("DVB"), a digital versatile disc system ("DVD"), and any other device capable of storing or recording digital video data and performing the functions as described herein.

Management system 22, in one embodiment, receives programming, i.e., a signal input 28, such as the viewable portions of moving image data, audible portions of sound data, or a combination of such image data and sound data from a signal source 30. The signal input 28 includes one or more tuners 74 and one or more signal decoders 76, one of each being illustratively shown. Each tuner 74 allows signal input 28 to receive multiple channels of data from signal source 30, while each signal decoder 76 of signal input 28 can decode video data from a compressed video format (e.g. MPEG) and video data from an analog format to a digital format, or from a digital format to an analog format, depending upon the operation of management system 22.

As illustrated, management system 22 can include a user input interface 32 that receives input from an input device 34 over an input link 36. Input device 34 generates instructions to control the operation of management system 22, such as operating Web browser software within management system 22 when management system 22 is a set-top box or an Internet terminal. Input device 34, therefore, may take the form of a remote control, a keyboard, a microphone, or any other device capable of generating instructions for management system 22.

To operate and implement various functions of management system 22, management system 22 can include a processing unit 38, i.e., a central processing unit ("CPU"), coupled to an application-specific integrated circuit ("ASIC") 40. Both processing unit 38 and ASIC 40 incorporate software and/or hardwired logic circuitry that uses computer-executable instructions, such as those of the present invention, to control and implement the functions of management system 22.

Typically, processing unit 38 and ASIC 40 can be coupled via a system bus 42, which interconnects various other system components, such as system memory 44, mass storage interface 46, user interface 32 and signal input 28. Instructions, data, and other software necessary for the operation of processing unit 38 and ASIC 40 can be stored in system memory 44, such as in read-only memory ("ROM") 48 and/or in random-access memory ("RAM") 50, and/or in a mass storage device 52, such as a magnetic hard disk 54 or any other magnetic or optical mass memory device that is capable of storing data, including video data 56, application programs 58, other program modules 60, an updateable electronic programming guide ("EPG") 62, or any other desired computer-readable instructions or data. Such ROM 48, RAM 50, and mass storage device 52 are communicatively coupled to ASIC 40, thereby allowing data to be readable by ASIC 40 and written from ASIC 40 to RAM 50 and possibly mass storage device 52.

In this illustrative configuration, management system 22 is capable of communicating with a remote computer 64 via a wide area network ("WAN") 66, such as the Internet, by way of a serial port interface 68 interposed between system bus 42 and a modem 68. While serial port interface 68 may be used to connect modem 70 for communicating across a WAN, serial port interface 68 may also be utilized to connect other consumer electronic devices, such as video game 72, and/or various input devices, such as a keyboard (not shown) or joystick (not shown), to management device 22. Additionally, instead of modem 70, some other wireless link or other means for establishing communications over a communication line connection may be included, either internally or externally to management system 22. Further, in other configurations of the presently described illustrative environment, management system 22 may be capable of transmitting information via the Internet by direct-dial communication over standard telephone lines, or by using any other available communication medium or communication line connection. Management system 22 also includes a video output 78 and an audio output 82.

2. MPEG Video Data and Parameter Values

Figure 2:
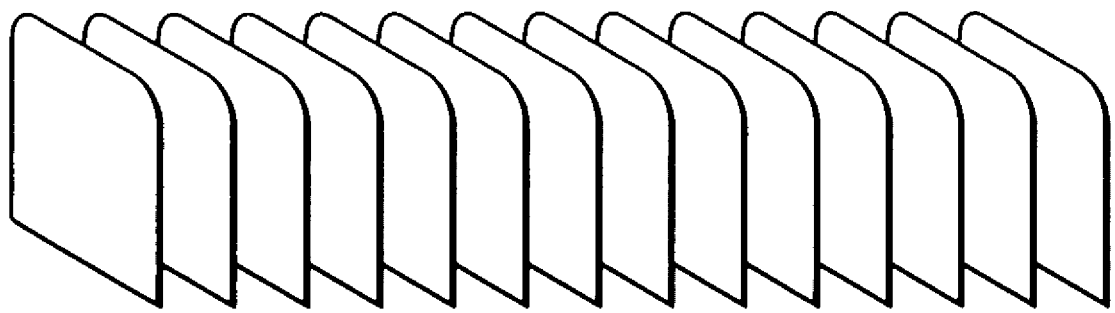
FIG. 2 illustrates the prior art rendition of MPEG and the frames that comprise a group of pictures which is one of the fundamental elements of the MPEG digital compression format.
Figure 2:
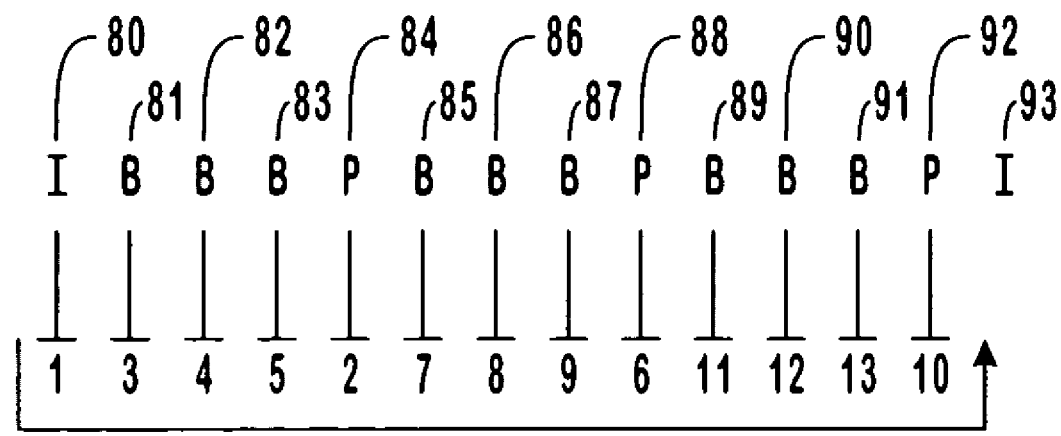
Figure 3:
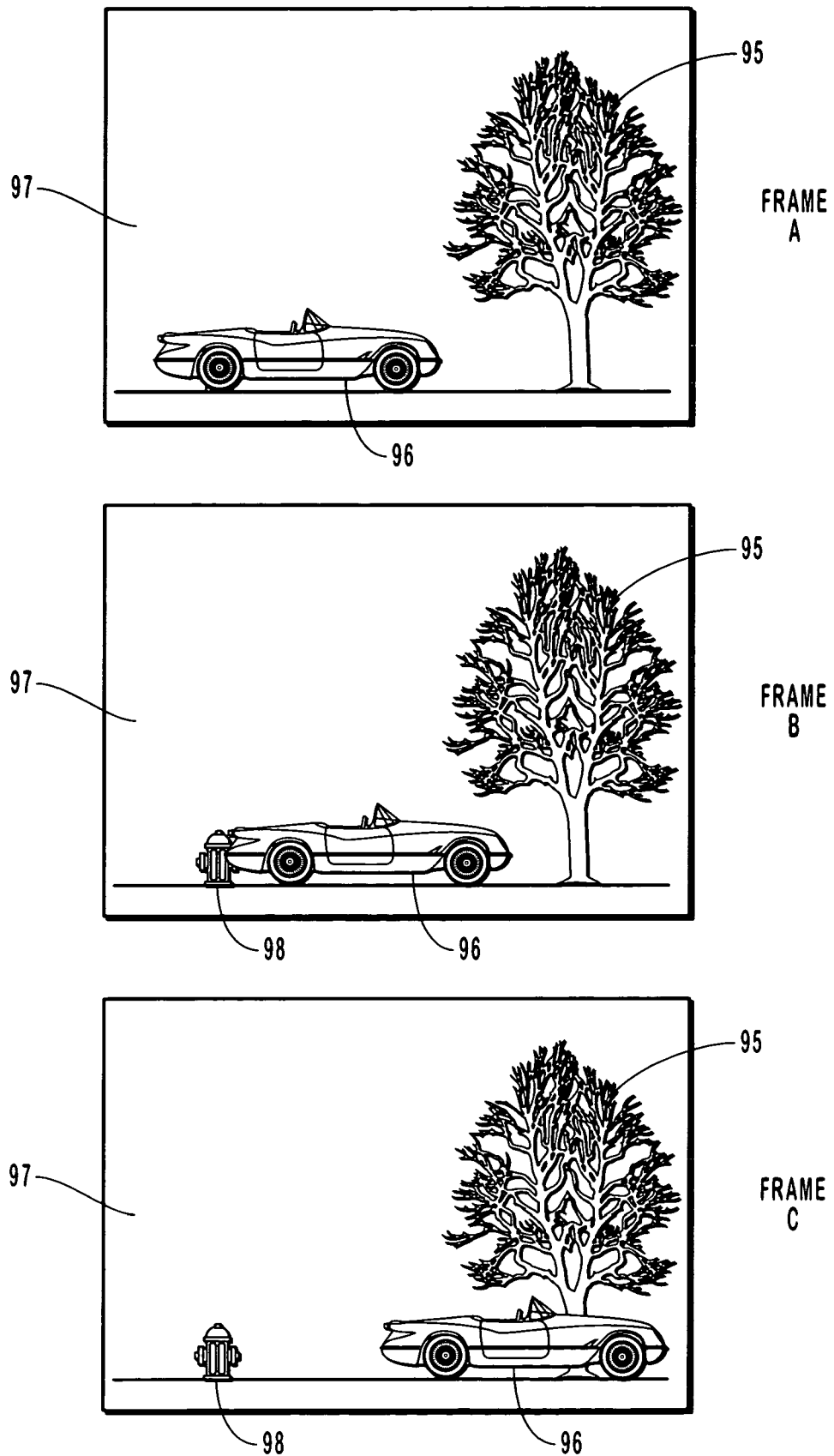
FIG. 3 illustrates the manner in which video compression systems such as MPEG eliminate redundancy in digital video data.

Although the present invention can be used with various video data formats, one commonly used format is defined by the Moving Pictures Experts Group (MPEG) standard. FIGS. 2 and 3 illustrate the general principles of MPEG whereby motion compensation is used in digital compression to render digital video segments. This general explanation of MPEG is intended to provide a framework for understanding many of the principles associated with identifying segment transitions and effectuating a system for automatically skipping to appropriate segment transitions.

FIG. 2 there is shown a group of pictures (GOP) 70. Pictures 80 through 93 comprise a group of pictures in MPEG. Typically a GOP is arranged as repetitive structures numbering between 10 and 30 frames. Two or more groups of pictures comprise a sequence of pictures. A typical MPEG data stream is based on a repeating GOP structure.

MPEG employs interframe encoding, which means some of the frames are used as reference frames for other frames in the video stream. An MPEG stream and the GOPs included therein include of I-frames 80 and 93, P-frames 84, 88, and 92 and B-frames 81-83, 85-87, and 89-91. I-frames, or "Intraframes," are independent frames that may be decompressed and reproduced independently without referring to any other frames in the MPEG video stream. P-frames, or "Predictive" frames, are encoded and decoded using the previous I-frame or P-frame. B-frames, or "Bi-directionally predictive" frames, are encoded and decoded using frames that are shown previous to and/or subsequent to the B-frame. Since I-frames do not reference other frames for information, I-frames are typically substantially larger in size than P-frames and B-frames.

Much of the data compression of MPEG is obtained by encoding P-frames and B-frames to include less than all of the video data that would be required to reconstruct the images of these frames independently and without reference to other frames. P-frames and B-frames are encoded by applying motion vectors to previously encoded frames, thereby defining the motion of elements of the image between the frames. The images of MPEG frames are encoded in macroblocks consisting of 16×16 luminance pixels, which define the basic unit for motion prediction. Using motion prediction, the image encoded in a P-frame can be reconstructed by using, either directly or indirectly, video data encoded in a previous I-frame. Similarly, B-frames can be reconstructed by using video data included in the adjacent P-frames and/or I-frames.

When rendering an MPEG stream, the stream is read in decode sequence and all of the frames are displayed in display sequence. MPEG is effective because MPEG makes more efficient use of bandwidth than techniques that separately encode each frame. Although there is some loss of picture quality using MPEG, the visual elements that are lost due to the interframe encoding and decoding processes are often not perceived by the human eye to any significant extent. Thus, to the human eye, playback of MPEG compressed digital video at conventional speeds appears true to the original moving image.

Referring now to FIG. 2, each I-frame starts a new GOP 70 and contains all the information necessary to reconstruct an image from I-frame 80 without reference to or prediction from other frames. In addition, I-frame 80 represents a base frame from which subsequent P-frames and B-frames are encoded and decoded. The first P-frame 84 is coded using temporal encoding with the previous I-frame 80 acting as a reference. The subsequent P-frame 88 uses the previous P-frame 84 as its reference and so on. B-frames 81, 82, and 83 are coded using information from the previous I-frame 80 using forward prediction and the following P-frame 84 using backward prediction.

Frames 80 through 93 are arranged sequentially representing the order in which they are displayed. However, display order does not equate with the order in which they are sent to the decoder. Because B-frames use information from both the previous and following anchor frames as a reference, to enable decoding of B frames 81, 82, and 83 requires the decoder to have previously received both the preceding I-frame 80 and the following P-frame 84. The numbers 1-13 below frames 80-93 represent the order in which the frames can be decoded by a decoder.

FIG. 3 illustrates how the MPEG video compression format can eliminate redundant information in consecutive frames. With reference to FIG. 3, frame A illustrates a tree 95, a car 96, and background 97. Frame C illustrates the picture at a slightly later time. The perspective has followed the car 96 to the right resulting in a leftward shift of stationary objects such as the tree 95 and the background 97. Furthermore, the car 96 now obscures part of tree 95, and fire hydrant 98 is now visible. Frame B shows an intermediate point somewhere between frame A and frame C.

In this example, it is assumed that frame A is an I-frame. Accordingly, the entire image is encoded without reference to any data that is outside frame A. It is also assumed, for purposes of illustration, that frame C is encoded as a P-frame. For each macroblock in frame C, the encoder searches for a matching macroblock in A. The purpose of the searching is to find a motion vector that connects the macroblock in frame C to an identical or very similar macroblock in A. The use of motion prediction also employs residuals to compensate for slight variations in macroblocks used from frame A.

Because frames A and C contain substantially redundant information, motion prediction based on frame A can be used to define most of the image included in frame C. For example, both tree 95 and car 96 are represented by the macroblocks in frame A, and motion prediction can be used to define where these elements of the image are to appear in frame C. However, the fire hydrant 98 of frame C is not represented in frame A, and thus the macroblocks of frame C containing this portion of the image are generally intra-coded without reference to frame A.

Once frame A (an I-frame) and frame C (a P-frame) are encoded, the encoder is then capable of encoding frame B as a B-frame using the encoded information in frame A and frame C as reference frames. Because every macroblock in frame B is substantially present in either frame A or frame C, frame B can be encoded almost entirely using motion vectors from frames A and C. This type of encoding is known as bidirectional encoding.

The complexity and expense of MPEG lies in the process of encoding and, to a lesser extent, the decoding of the video data. Using a more complex encoder reduces the complexity and expense of MPEG decoders necessary to reconstruct the images encoded in the MPEG stream. The MPEG standard does not define an encoding method. Rather, an MPEG stream must simply comply with the constraints set by the MPEG standard to allow the stream to be read by an MPEG standard decoder. Such constraints include the horizontal picture size, the vertical picture size, the number of macroblocks, the picture rate, the number of macroblocks times the picture rate, the video buffering verifier (VBV) buffer size, and the bit rate.

3. Skipping Playback of Recorded Video Data to Segment Transitions

As described above, the method of skipping playback of a recorded video program to a segment transition is performed based on calculated local difference values of selected quantifiable parameters of the video data. The inventors have observed that the values of various parameters of video data, such as those described in greater detail below, can vary from frame to frame and often exhibit significant variation at the boundaries between adjacent segments of a video data, such as the boundary between a television commercial and the subsequent television program. In order to enable a viewer to cause the playback of video data to be skipped to such segment transitions, the local difference values of the parameters are calculated and stored with the recorded video data as will also be described in greater detail below.

Figure 4:
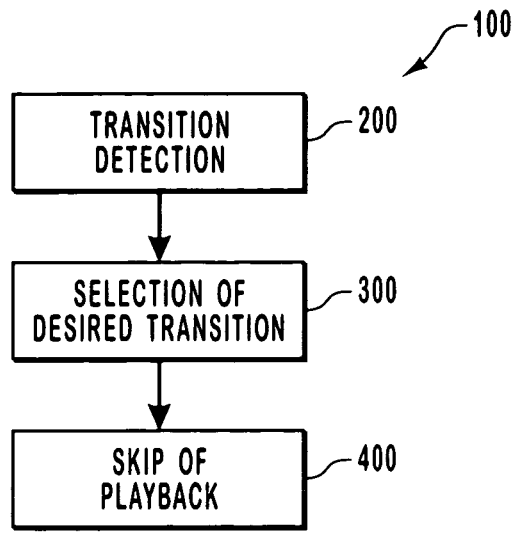
FIG. 4 is a block diagram representing a system for skipping replay of video data to a segment transition.

FIG. 4 illustrates a high-level flow diagram of one method of skipping to a segment transition according to the invention. Method 100 is typically implemented in a video compression encoder and an associated decoder system, such as management system 22 of FIG. 1.

Transition detection 200 represents the process of identifying candidates for segment transitions and for generating and storing the identifying information with the recorded video data. Transition detection 200 can be implemented either in the video encoder or at the decoder. In one embodiment, the transition detection 200 is performed by the video encoder to exploit the computational power of such encoders. Alternatively, the transition detection 200 can be performed by the set-top box (e.g., management system 22 of FIG. 1) so that the process of identifying segment transitions can be performed without relying on a third party broadcaster or third party entity that encodes the MPEG data.

Selection of desired transition 300 refers generally to the process of selecting a segment transition to which the replay of the video data will be skipped from among the plurality of segment transitions that may have been identified in transition detection 200. Skip of playback 400 refers generally to the process of causing the replay of the video data to advance to the selected segment transition. Processes 300 and 400 are typically implemented in the processor associated with the video decoder in the home entertainment system or microprocessor so as to enable the viewer to control these processes. Those skilled in the art will appreciate that method 100 can be implemented in other arrangements without departing from the spirit or essential characteristics of the invention. For example, transition detection 200, selection of desired break 300, and skip of playback 400 can all be implemented in the processor associated with the decoder.

Figure 5:
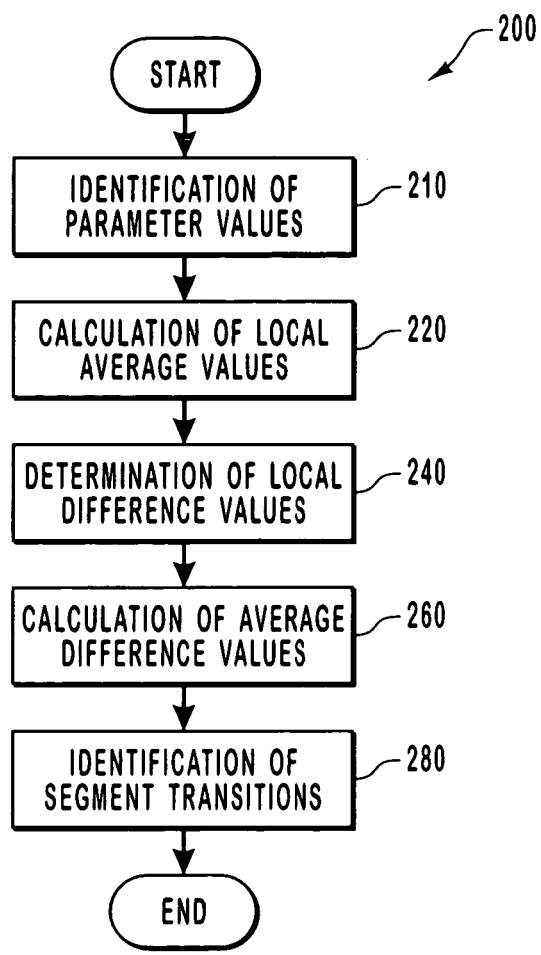
FIG. 5 is a block diagram illustrating the steps of transition detection.

FIG. 5 illustrates in greater detail the process generally referenced by transition detection 200. In step 210, the parameter values of the video data are identified for a plurality of positions, or points in time, in the video data, such as at every frame, at one-second intervals, or the like. In general, the invention can be practiced by processing any of a large number of parameters associated with video data that can change with respect to time. For example, the parameters can include the I-frame size, the size of other frames, luminance of the encoded image, the frequency of I-frames in the video stream, the overall quantization scale used to encode the color of the-image, etc. Upon learning of the invention disclosed herein, those skilled in the art will recognize that any of a large number of other parameters can be identified and measured to perform the invention. For purposes of illustration, I-frame size will be designated as one of the parameters that are measured in the following description unless otherwise specified.

Once the values of the parameters are identified at the plurality of positions in step 210, the remainder of the method illustrated in FIG. 5 is directed to identifying the positions in the video data at which the rate of change of the parameter values is at a local maximum. Because the parameters tend to change at segment transitions, the positions at which such local maximums occur are designated as candidates for being segment transitions. Calculation of local area average values in step 220 determines the average values of individual parameters for local areas preceding and following the plurality of positions in the video data.

Referring now to FIG. 6, there is shown an illustration of the process of determining local area average values in more detail. Determination of local difference value 240 identifies how much a selected parameter, such as I-frame size, is changing at a given position in the video stream. Calculation of local area average values 220 provides average values of local areas preceding and following the given position necessary for determination of local difference value 240. The selected parameter is a parameter that is found to be a good indicator of transitions in the video stream either alone or when considered along with other parameters. Examples of possible parameters include luminance, effective frames per second, I-frame size, I-frame frequency, overall quantization scale, etc.

The position 242 for which the calculation is to be preformed is identified as T=0, and the process illustrated in FIG. 6 is repeated for multiple positions at specified intervals in the video data, such as every frame, every nth frame, every second, or the like. To calculate the local area average of the I-frame size, the system selects a preceding local area 244 and a following local area 246 having a designated size. For instance, local areas 244 and 246 can have a value of 5 seconds, although any other duration can be used so long as it is long enough to yield meaningful averages. Larger local areas 244 and 246 tend to increase computational requirements and also can obscure the significance of changes in parameter values close to the position at T=0. For the calculation of local area average values in local areas 244 and 246, the system identifies and either sums or averages the values of the parameters at various positions within the local area. For instance, if the parameter is I-frame size, the size of all I-frames in preceding local area 244 is summed or averaged to generate a preceding local average value and the size of all I-frames in following local area 246 is summed or averaged to generate a following local average value.

For example, calculation of local area average values can proceed by adding parameter values for the local area and dividing by the total number of parameter values identified to establish local area average values. The average value for preceding local area 244 is identified in FIG. 6 as A. The average value for the following local area 246 is identified in FIG. 6 as B.

Referring again to FIG. 5, determination of local difference values for the plurality of positions in step 240 identifies how much a parameter value changes at a given position in the video stream by calculating the absolute value between the local average value for the local area preceding the position from the local average value for the local area following the position.

Referring again to FIG. 6, the determination of the local difference value is conducted by calculating the absolute value of the difference between B and A. Thus, the difference value is given by the equation:

$$|B-A| = \text{local difference value.} \quad (\text{Eq. 1})$$

It is noted that the local difference value, which is the absolute value of the difference between the local average of the parameter values immediately preceding a position in the video data and the local average of the parameter values immediately following the position is generally analogous to the first derivative of the sequence of parameter values over the local area with respect to time or, in other words, the rate of change of the parameter values at the position. As noted previously, the inventors have observed that parameter values often change at segment transitions. Accordingly, a position in the video data whose local difference value is a local maximum generally is a position at which the parameter value is changing and, therefore, represents a position that is a candidate for being a segment transition.

Referring again to FIG. 5, if multiple parameters are being considered, step 260 is performed, in which the multiple local difference values are either summed, averaged, or otherwise combined to generate average difference values. For example, the contribution of I-frame size and overall quantization of the image can be combined in step 260. Furthermore, depending on the absolute magnitude of the local difference values and the parameter values, each of the local difference values can be given specified weights so that each contributes an appropriate amount to the average difference values. While the "average difference values" calculated in step 260 can be used as desired, the following description will be made in reference to "local difference values" unless otherwise specified. It should be understood that the "average difference values", if such have been calculated, can be substituted for "local difference values" in the following description. Moreover, as used in the claims and the specification, the term "local difference value" encompasses both the local average value for a single parameter and also the "average difference value" associated with multiple parameters.

Identification of segment transitions is accomplished by identifying the positions in the video data whose local average value is a local maximum with respect to the local average values of adjacent positions. Therefore, identification of segment transitions can be accomplished by plotting the local difference values for each position in the video stream vs. time, in which a peak, or local maximum, in the curve represents a transition from one sequence to a different and distinguishable sequence. In many implementations, a physical plotting of the values is not performed, although the concept of "plotting" the values is a useful conceptual tool for describing the process of identifying local maximum values. Accordingly, any reference herein to "plotting" also extends to other techniques for identifying local maximum values.

Referring now to FIG. 7 there is shown a representation of what can be gleaned from plotting or comparing local difference values. Once the difference value has been determined for each position, the difference value for each position can be plotted as a function of time in the video stream. Peaks 250 and 252 in the positional parameter change curve 254 identify positions where the selected parameter is changing. Segments 256 and 258, where the difference value is at or close to the baseline 259 (i.e., difference values close to zero), represent portions of the video segment where there is little or no change in difference value of the selected parameters.

Referring now to FIG. 8, there is shown a simplified explanation of the calculation of average difference value 260, which, as explained above, is an average of a plurality of local average values associated with multiple parameters. In the calculation of average difference value 260, the sum of the local difference value of all parameters ($DV_a + \ldots DV_n$) is divided by the total number of parameters (n) used to obtain the sum. The resulting average difference value ($A_{DV}$) represents an average of how all parameters are changing at the position in the video data. For example where the local difference value for parameter A=3, the local difference value for parameter B=1, and the local difference value for parameter C=3, then the average difference value for the particular position in the video data is 2.33, as shown in FIG. 8. It is noted that the step of dividing the sum by n can be omitted, as the position and relative value of the local maximum, rather than the absolute value of the local maximum, are the information useful in identifying candidates for segment transitions. Moreover, those skilled in the art, upon learning of the disclosure made herein, will recognize that there are numerous other similar or equivalent computational methods for generating average difference values or local average values that can be used with the invention.

The advantage of combining local difference values for a plurality of parameters is that, in combination, multiple parameters often provide a better indicator of transitions than a local difference value for a single parameter. A single parameter can change within a given segment for reasons other than a segment break. For example, luminance may increase to accommodate a change in the program content. However, a simultaneous change in a plurality of parameters provides a better indication of a transition between distinguishable segments by controlling for or diminishing the effect of arbitrary changes of single parameters. For example, the I-frame rate, the luminance, and the quantization scale may all change at a transition from a program segment to a commercial segment while luminance alone may vary within the program segment.

In one embodiment, local difference values for various parameters are weighted to reflect how well changes in the parameter indicate the existence of segment transitions or to normalize the magnitude of changes that are typically experienced for given parameters. For example, it may be found that I-frame frequency is a better transition indicator than luminance. The weight given to each parameter is included in the calculation of the average difference value. Those skilled in the art will appreciate that such weighting can be accomplished using multipliers or the like. When average difference values based on multiple parameters are used instead of a local difference value of a single parameter, the average difference value is plotted or otherwise analyzed in the manner described above in reference to FIG. 7.

Figure 9A:
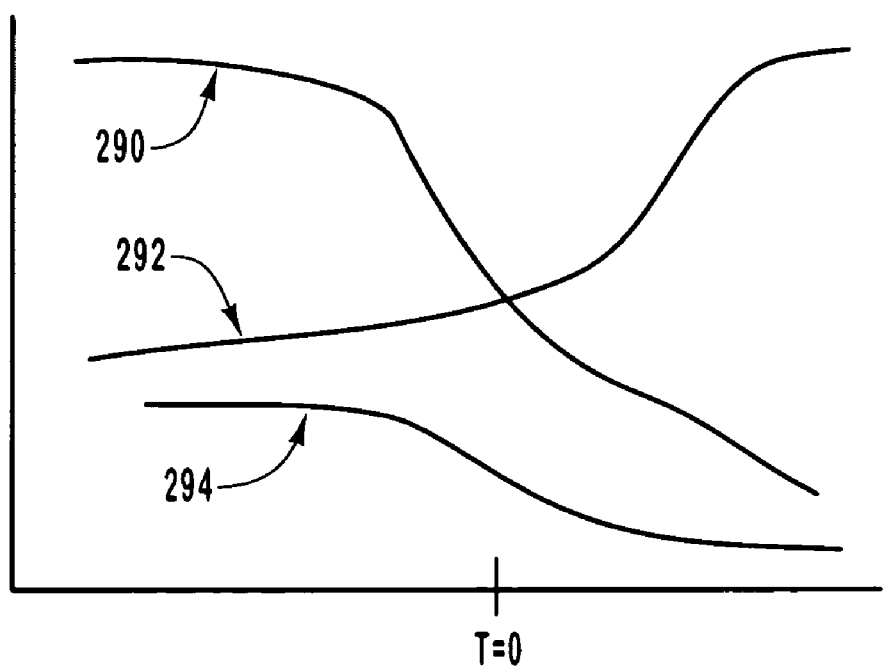
FIG. 9 is a schematic diagram illustrating a method of obtaining an average difference distribution from a plurality of individual difference value distributions for identification of segment transitions.
Figure 9B:
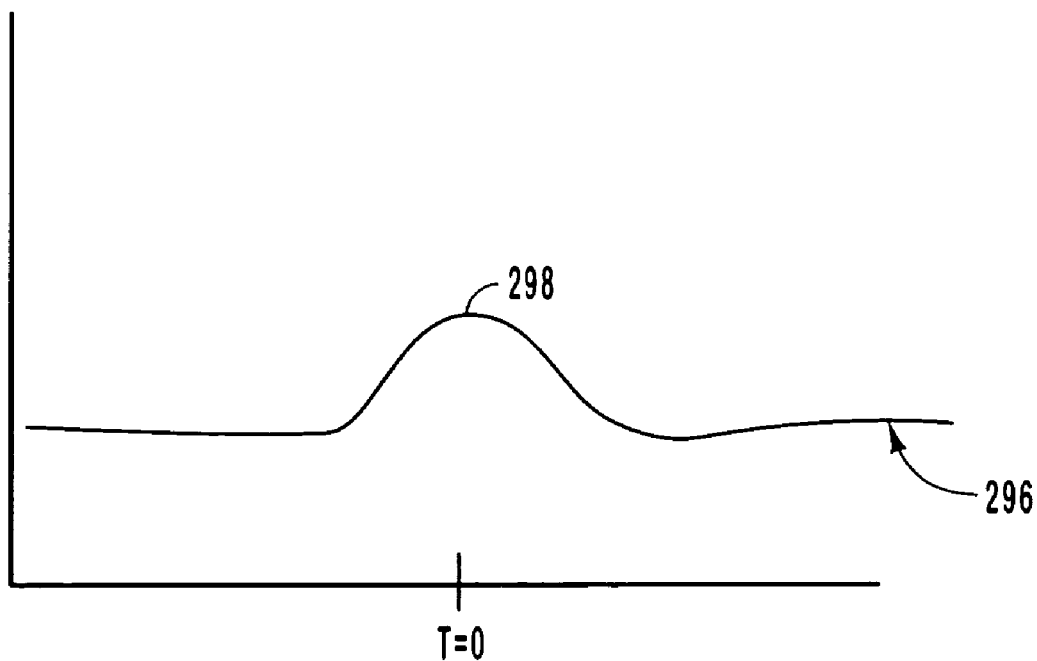

FIG. 9 illustrates another embodiment of the identification of segment transitions. This illustration employs the local difference value distributions of individual parameters mentioned in the discussion of FIG. 6. In this embodiment, the local difference value distributions for each parameter are combined and then divided by the number of difference value distributions to produce an average difference value distribution. For example, curve A 290 represents the value of a first selected parameter with respect to the position of the parameter in the video data. Curve B 292 represents the value of a second selected parameter with respect to the position of the parameter in the video data. Similarly, curve C 294 represents the value of a third selected parameter with respect to the position of the parameter in the video data. It is noted that the rate of change of these three parameters is at a maximum at or near time T=0. The rate of change of the parameters is approximated by calculating the local difference values for the parameters as described above. The sum of the local difference values for each parameter is divided the total number of parameters, although the step of dividing may be omitted, as the position and relative value of the local maximums of the rate of change of the parameters are useful for identifying segment transitions rather than the absolute value of the rate of change. Peak 298 in the average difference value distribution identifies that it is likely that a segment transition in the video stream, where one video segment is transitioning to a different and distinguishable segment, exists at time T=0.

In one embodiment, the computational power of the encoder is utilized to identify locations in the video data that are candidates for being segment transitions. The encoder can place transition tags, which denote the existence of a likely segment transition, in the video data upon identifying the likely segment transitions 280. Upon the playback of a recorded copy of the video data, the transition tags are recognizable by the decoder or another component of the digital video system as an indication of the likely existence of a segment transition. The transition tag can be formatted to contain information that can distinguish large changes in parameter values from smaller changes, which tend to correspond to the likelihood that the candidate for the segment transition is actually a segment transition.

The transition tag allows the processor of the digital video system to quickly and efficiently recognize and select from possible transition positions in response to a user skip request. For example, in one embodiment of the present invention, the user may want to skip only to a position in the video data that corresponds to large changes in the parameter values, which are likely to occur at significant transitions in the video data, such as a transition between a program segment and a commercial segment. The parameter information contained in the transition tag can be used to identify such large transitions. In another embodiment of the invention, transition tags are only placed on transitions satisfying minimum local difference value criteria, which tends to eliminate the identification of insignificant or non-existent segment transitions.

Alternatively, when an encoder quantifies parameter values, it can simply insert information representing the parameter values or the rate of change of the values into the video data rather than inserting transition tags. In this technique, the decoder or another component at the digital video data system analyzes the information representing the parameter values to identify candidates for segment transitions. In other embodiments, the digital video data system measures the parameter values directly to identify segment transitions, which enables the digital video data system to operate independently and without the need to rely on the source of the video data for identification of segment transitions.

Figure 10A:
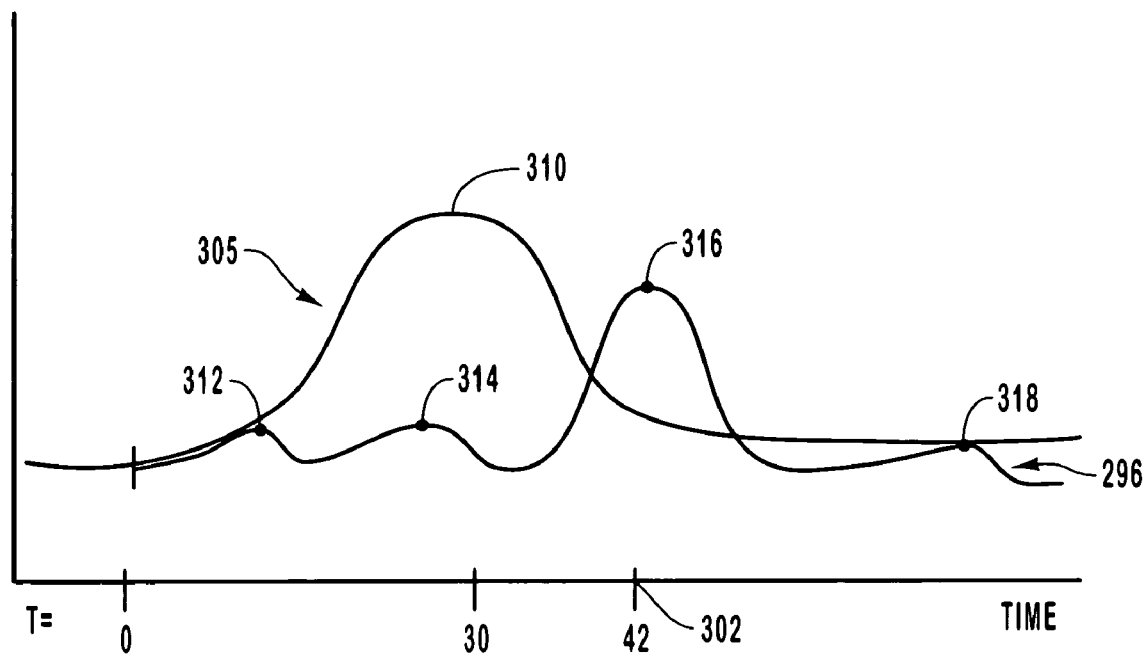
FIGS. 10A and 10B illustrate the selection of desired transitions using a Gaussian distribution function and an average difference distribution.
Figure 10B:
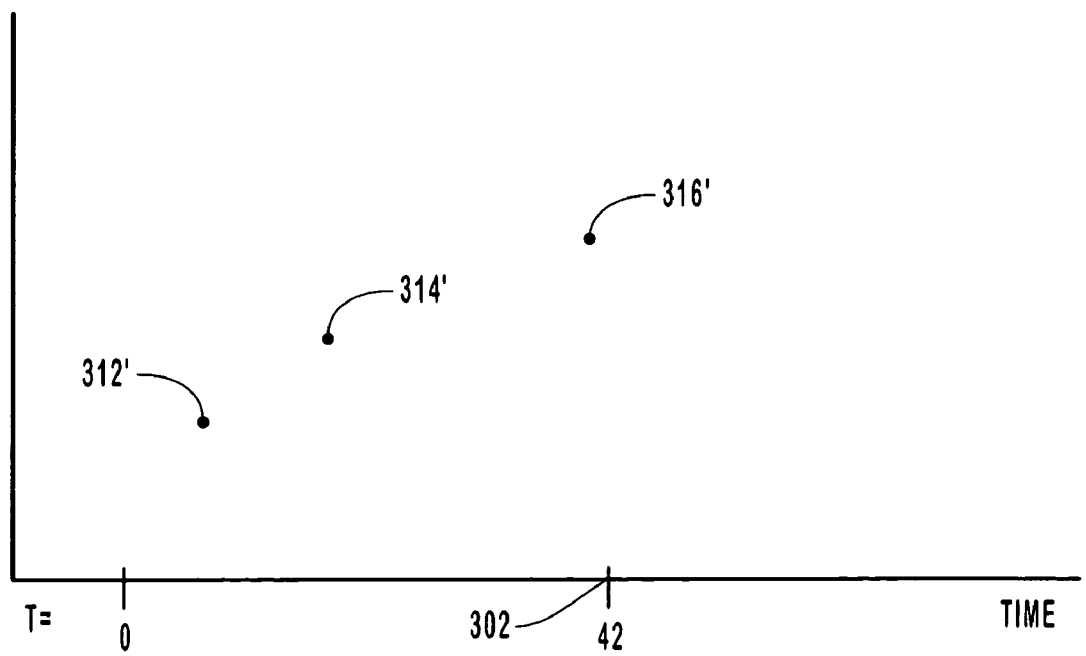

FIGS. 4-9 have been used above to describe techniques for identifying positions within video data that are candidates for being segment transitions. FIGS. 10A and 10B illustrate a method for selecting a desired segment transition to which playback is to be skipped in response to a skip request made by a viewer. The process of selecting the desired transition involves identifying the optimal position to which to skip the playback of the recorded video data based on a default skip length associated with the request from the viewer. For example, the default skip length may have a value of 30 seconds, which means that the digital video system tends to favor segment transition candidates approximately 30 seconds from the current playback position over segment transition candidates having at other temporal positions.

One approach for identifying the desired segment transition includes applying a Gaussian distribution curve 305 that is a function of the default skip length to the curve 296 representing the local difference values of a parameter of the recorded video data. The apex 310 of the Gaussian distribution curve 305 is at a temporal position with respect to the current playback position of the video data corresponding to the default skip length. For example, if the default skip length is 30 seconds, apex 310 is position 30 seconds in the future (T=30) with respect to the current playback position. For each segment transition candidate 312, 314, 316, and 318 (previously identified), the value of the local maximum is multiplied by the corresponding Gaussian distribution curve value to generate a product value that is weighted to favor candidates for segment transitions at a position near the default skip length. For example, as shown in FIG. 10B, the product value generated by multiplying the value of the local maxima of candidates 312, 314, 316, and 318 are represented by points 312', 314', and 316'.

Candidates outside the hump of the Gaussian (e.g., candidate 318 of FIG. 10A) need not be considered or multiplied by the Gaussian since the Gaussian would just reduce their magnitude to near 0. Thus the Gaussian used is not a true Gaussian, but a Gaussian modified in some way so that its value becomes 0 outside its main hump region. The resulting product magnitude for each candidate is then plotted as illustrated in FIG. 10B. The candidate with the greatest product magnitude represents the desired transition, which, in this example, is the candidate represented by point 316' positioned at time T=42 in the video stream. Once the digital video system has identified the desired segment transition, the playback of the recorded video data is skipped to the position in the video data that corresponds to the desired segment transition.

Another embodiment of the selection of a desired segment transition includes defining a standard against which local difference values or average difference values are compared to identify an appropriate segment transition. The typical change in parameter values associated with a commercial or other desired segment break can be used as a standard for identifying segment transitions to which to skip. Based on a skip request from a user, the digital video system identifies the next segment having local difference values or average difference values that fall within a range associated with the standard and then automatically skips playback to the identified segment transition.

The user skip request can be a one-touch skip designed to skip to a segment transition most closely corresponding with a default skip length. In alternative embodiments, a user skip request employs a more complex system allowing the user to request a tailored skip with a plurality of possible skip lengths. For example, a tailored skip system might allow a user to select from a short skip with a 30 second default skip length, a intermediate skip with a 2 minute skip length, and a long skip with a 5 minute skip length.

The selection of a desired segment transition as illustrated in FIG. 10 can employ information in the transition tags to distinguish large changes in parameter values from smaller changes in parameter values and to determine which segment transition candidate is the most appropriate in the context of the default skip length or the standard change in parameter values that has been identified as being typically associated with segment transitions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an entertainment system that is capable of playing back stored video data, wherein the video data is characterized by parameters that vary as a function of time within the video data, a method of skipping the playback of video data to a location selected to approximate a segment transition between segments of the video data, the method comprising the acts of:

playing back stored video data, wherein the video data includes information identifying a plurality of positions in the video data that are candidates for segment transitions by quantifying a rate of change in a value of a parameter of the video data at the plurality of positions in the video data, the candidates for segment transitions having been identified based on a comparison of values representing the change of the value of a parameter of the video data at a plurality of positions in the video data;

wherein quantifying the rate of change includes:
calculating for each of the plurality of positions, a preceding local average value of the parameter in a portion of the video data preceding the position;
calculating a following local average value of the parameter in a portion of the video data following the position; and
generating a local average difference value by calculating the absolute value of the difference between the preceding local average value and the following local average value;

skipping the playback of the video data to a location in the video data designated to approximate a segment transition between segments of the video data, by performing the acts of:
selecting one of the candidates for segment transitions as the location to which the playback is to be skipped; and
skipping the playback to the selected location and resuming playing back of video data from the selected location.

2. A method as defined in claim 1, wherein positions having a locally maximal local average difference value are identified as being candidates for segment transitions.

3. A method as defined in claim 1, wherein the information identifying positions in the video data that are candidates for segment transitions comprises transition tags inserted into the video data at the positions that are candidates for segment transitions, the transition tags having been inserted by the entertainment system after the entertainment system receives the video data.

4. A method as defined in claim 1, wherein the information identifying positions in the video data that are candidates for segment transitions has been inserted into the video data by an encoder prior to the entertainment system receiving the video data.

5. A method as defined in claim 1, wherein the act of selecting one of the candidates for segment transitions comprises the acts of:

at each of a plurality of positions that are candidates for segment transitions, multiplying the value representing the rate of change of the value of the parameter at the position with a corresponding value selected from a weighting curve, the shape and position of the weighting curve being selected to favor the selection of a candidate for segment transition that is positioned at a default skip length from a current playback position in the video data to generate a product value associated with the position; and selecting the position having the greatest associated product value.

6. A method as defined in claim 5, wherein the weighing curve defines a Gaussian distribution having an apex at the default skip length.

7. A method as defined in claim 1, further comprising the act of receiving input from a user requesting the playback to be skipped, the act of skipping the playback of the video data being initiated in response to the act of receiving input.

8. A method as defined in claim 1, wherein the candidates for segment transitions have been identified based on a comparison of values representing the change of the value of multiple parameters of the video data at a plurality of positions in the video data.

9. A method as defined in claim 1, wherein the parameter is selected from a group of parameters consisting of:
frame size;
luminance of an image encoded in the video data; and
overall quantization scale used to encode the color of the image.

10. A method as defined in claim 1, wherein:
the video data is encoded using a compression format that uses interframe decoding and includes periodic intraframes used in interframe decoding; and
the parameter represents a frequency of the intraframes in the video data.

11. A method as defined in claim 1, further comprising the act of receiving and storing the video data at the entertainment system for later playback of the video data.

12. In an entertainment system that is capable of playing back stored video data, wherein the video data is characterized by parameters that vary as a function of time within the video data, a method of skipping the playback of video data to a location selected to approximate a segment transition between segments of the video data, the method comprising the acts of:

storing video data that has been received by the entertainment system;
calculating values representing the rate of change of the value of a parameter of the video data at a plurality of positions in the video data;

identifying positions in the video data that are candidates for segment transitions by calculating for each of the plurality of positions: (a) a preceding local average value of the parameter in a portion of the video data preceding the position; (b) calculating a following local average value of the parameter in a portion of the video data following the position; and (c) generating a local average difference value by calculating the absolute value of the difference between the preceding local average value and the following local average value;

storing with the video data the segment transition candidates;

playing back the video data;

receiving input from a user requesting that the playback be skipped to a segment transition between segments of the video data;

in response to the input, selecting one of the candidates for segment transitions as the location to which the playback is to be skipped; and skipping the playback to the selected location and resuming playing back of video data from the selected location.

13. A method as defined in claim 12, wherein the act of selecting one of the candidates comprises the acts of:

at each of a plurality of candidate positions in the video data, multiplying the value representing the change of the value of the parameter at the position with a corresponding value selected from a weighting curve, the shape and position of the weighting curve being selected to favor the selection of a candidate for segment transition that is positioned at a default skip length from a current playback position in the video data to generate a product value associated with the position; and selecting the position having the greatest associated product value.

14. A method as defined in claim 13, wherein the default skip length is thirty seconds.

15. A method as defined in claim 13, wherein candidate positions that fall at locations in the weighting curve at which the weighting curve has value 0 are not considered or multiplied by the weighting curve.

16. A method as defined in claim 12, wherein the act of identifying positions in the video data that are candidates for segment transitions comprises the act of identifying positions having a local average difference that is a local maximum.

17. A method as recited in claim 13, wherein the act of storing values representing the change of the value of a parameter of the video data at a plurality of positions in the video data comprises the act of receiving the stored values with the video data.

18. A computer program product comprising one or more computer-readable storage media storing computer-executable instructions which, when executed by a processor, implement a method of an entertainment system skipping the playback of video data to a location selected to approximate a segment transition between segments of the video data, wherein the video data is characterized by parameters that vary as a function of time within the video data, and wherein the method comprises:

storing video data that has been received by the entertainment system;

calculating values representing the rate of change of the value of a parameter of the video data at a plurality of positions in the video data;

identifying positions in the video data that are candidates for segment transitions by calculating for each of the plurality of positions: (a) a preceding local average value of the parameter in a portion of the video data preceding the position; (b) calculating a following local average value of the parameter in a portion of the video data following the position; and (c) generating a local average difference value by calculating the absolute value of the difference between the preceding local average value and the following local average value;

storing with the video data the segment transition candidates;

playing back the video data;

receiving input from a user requesting that the playback be skipped to a segment transition between segments of the video data;

in response to the input, selecting one of the candidates for segment transitions as the location to which the playback is to be skipped; and skipping the playback to the selected location and resuming playing back of video data from the selected location.

19. A computer program product as recited in claim 18, wherein the act of selecting one of the candidates comprises the acts of:

at each of a plurality of candidate positions in the video data, multiplying the value representing the change of the value of the parameter at the position with a corresponding value selected from a weighting curve, the shape and position of the weighting curve being selected to favor the selection of a candidate for segment transition that is positioned at a default skip length from a current playback position in the video data to generate a product value associated with the position; and selecting the position having the greatest associated product value.

20. A computer program product as defined in claim 19, wherein the weighing curve defines a Gaussian distribution having an apex at the default skip length.

21. In an entertainment system that is capable of playing back stored video data, wherein the video data is characterized by parameters that vary as a function of time within the video data, a method of skipping the playback of video data to a location selected to approximate a segment transition between segments of the video data, the method comprising the acts of:

playing back stored video data, wherein the video data includes information identifying positions in the video data that are candidates for segment transitions, the candidates for segment transitions having been identified based on the calculation of one or more local difference values for each of one or more quantifiable parameters that define variable properties of the video data that vary as a function of time within the video data;

skipping the playback of the video data to a location in the video data designated to approximate a segment transition between segments of the video data, by performing the acts of:

selecting one of the candidates for segment transitions as the location to which the playback is to be skipped; and skipping the playback to the selected location and resuming playing back of video data from the selected location.

22. In an entertainment system that is capable of playing back stored video data, wherein the video data is characterized by parameters that vary as a function of time within the video data, a method of skipping the playback of video data to a location selected to approximate a segment transition between segments of the video data, the method comprising the acts of:

receiving video data at the entertainment system;

calculating values representing the rate of change of the value of a parameter of the video data at a plurality of positions in the video data;

identifying positions in the video data that are candidates for segment transitions by comparing the values representing the change of the value of the parameter at a plurality of positions in the video data;

playing back the video data;

receiving input requesting that the playback be skipped to a segment transition between segments of the video data;

in response to the input, selecting one of the candidates for segment transitions as the location to which the playback is to be skipped; and skipping the playback to the selected location and resuming playing back of video data from the selected location;

wherein said selection of the one of the candidates includes: at each of a plurality of candidate positions in the video data, multiplying the value representing the change of the value of the parameter at the position with a corresponding value selected from a weighting curve, the shape and position of the weighting curve being selected to favor the selection of a candidate for segment transition that is positioned at a default skip length from a current playback position in the video data to generate a product value associated with the position; and selecting the position having the greatest associated product value.

23. A method as recited in claim 21, wherein the one or more quantifiable parameters include at least one of a change in a size of I frames, a change in a frequency in which I frames are received or a change in frame rate.

24. A method as recited in claim 21, wherein the information identifying the positions comprise one or more tags.

* * * * *